May 31, 1966  R. F. LEWANDOWSKI  3,254,164
MOLDED PLASTIC SWITCH WITH INWARDLY PROJECTING CONTACTS
AND ROTOR POSITIONING STRUCTURE
Filed Feb. 2, 1965
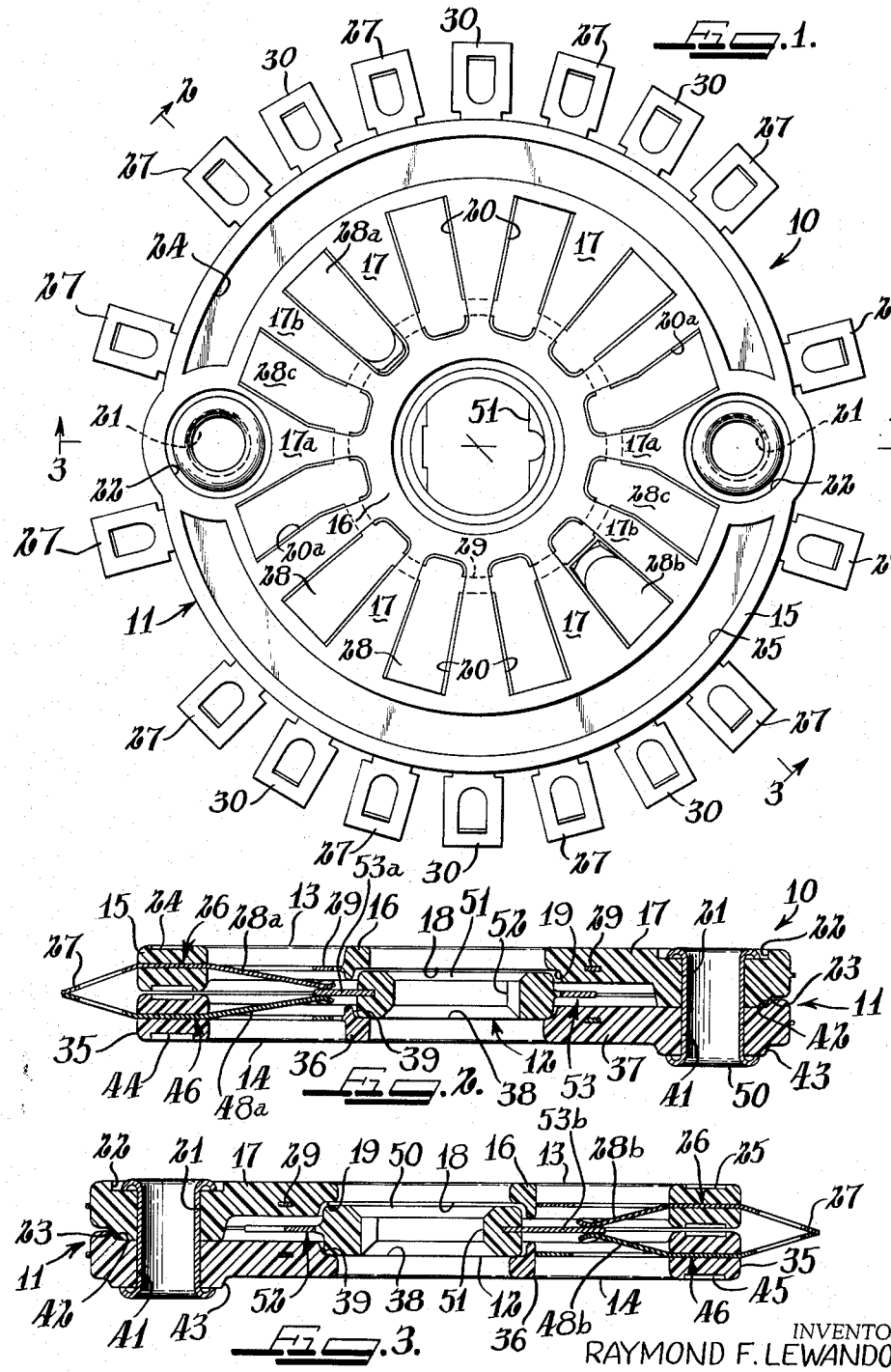
INVENTOR.
RAYMOND F. LEWANDOWSKI
BY Hofgren, Wegner,
Allen, Stellman & McCord
Attys.

United States Patent Office 3,254,164
Patented May 31, 1966

3,254,164
MOLDED PLASTIC SWITCH WITH INWARDLY PROJECTING CONTACTS AND ROTOR POSITIONING STRUCTURE
Raymond F. Lewandowski, Mount Prospect, Ill., assignor to Oak Electro/Netics Corp., a corporation of Delaware
Filed Feb. 2, 1965, Ser. No. 429,833
20 Claims. (Cl. 200—11)

This invention relates in general to an electric switch, and more particularly to a rotary electric switch wherein the rotor contacts and the stator contacts are formed integrally with the rotor and the stator, respectively.

Those skilled in the art have recognized the need for a universal electric switch, which may be stored in component form subsequent to the performance of certain manufacturing steps, and prior to the completion of the particular switch. The switching configuration can be established by proper cutting and forming at the time of final assembly of the switch. The present invention fills this need by providing a switch construction wherein rotor and stator contact members are first formed by stamping them from a sheet of suitable conductive material. The stator and rotor sections are then formed by molding a suitable plastic insulating material on the stamped or die cut web of conductive material. The components may be stored in this form until they are needed for assembly of a particular switch. At that time, the desired contact configuration is formed by severing or punching the rotor and stator contact members, and thereafter the switch elements are positioned properly relative to one another, and secured together. In the preferred form, the switch stator is defined by a pair of similar stator sections, each having a stator contact member embedded therein, and the switch rotor is formed of a unitary section having a single rotor contact member embedded therein.

An object of the invention is to provide an improved rotary electric switch of the character described above.

Another object of the invention is to provide a rotary electric switch as described above which is economical to manufacture and assemble.

A related object is to provide a rotary electric switch whose components utilize a minimum amount of material.

A further object of the invention is to provide a rotary electric switch, as described above, wherein the individual stator switch portions are readily accessible for maintenance and the like.

These and other objects of the invention will hereinafter become more fully apparent from the following description taken in connection with the annexed drawing, wherein:

FIG. 1 is a plan view of a preferred embodiment of the rotary electric switch;

FIG. 2 is a sectional view, taken generally along the line 2—2 of FIG. 1; and

FIG. 3 is a sectional view, taken generally along line 3—3 of FIG. 1.

While this invention is susceptible of embodiment in many different forms, there is shown in the drawing and will herein be described in detail one specific embodiment with the understanding that the present disclosure is to be considered as an exemplification of the principles of the invention and is not intended to limit the invention to the embodiment illustrated. The scope of the invention will be pointed out in the appended claims.

Referring now to the drawing, the preferred embodiment of the rotary electric switch 10 includes a switch stator 11 and a switch rotor 12. The switch stator 11 includes a pair of similar, generally circular stator sections 13 and 14.

The upper stator section 13 is formed of a suitable insulating material, and includes an annular outer ring 15, an annular inner ring 16 concentric with outer ring 15, and a plurality of radial spokes 17 extending therebetween. As can be best seen in FIGS. 2 and 3, the inner and outer rings 15 and 16 are generally rectangular in cross section, and the upper surfaces thereof are generally coplanar. Outer ring 15 is somewhat thicker than inner ring 16, so that the bottom surfaces thereof are disposed in spaced, generally parallel planes. The spokes 17 are substantially the same thickness as the inner rings 16, so that the respective upper and lower surfaces thereof are generally coplanar. An annular recess 18 is provided in the lower surface of the inner ring 16 to define an undercut shoulder 19. Shoulder 19 provides a portion of a rotor receiving chamber, as will hereinafter become more fully apparent. Spokes 17 cooperate to define generally segmented openings 20, which materially reduces the amount of insulating material required for the stator section, and which provides access to the individual stator contact portions, as will hereinafter become more fully apparent.

Diametrically opposed apertures 21 are provided in the outer ring 15, in radial alignment with spokes 17a. From FIG. 1, it will be observed that spokes 17a are somewhat wider at their outer end than the spokes 17, so as to insure adequate material around the apertures 21. This results in the provision of openings 20a adjacent spokes 17a whose outer ends deviate somewhat from a true radial line extending outwardly from the center of the stator section. As can also be seen in FIG. 1, the shape of the openings 20a produces spokes 17b on the sides thereof opposite from spokes 17a whose outer portions are generally parallel. An annular recess 22 is provided in the upper surface of the outer ring 15, and is adapted to receive the head of a fastener therein, or a locating projection on an adjacent stator section, as will hereinafter appear. Generally cylindrical locating projections 23 are provided on the lower surface of the outer ring 15 around apertures 21, and serve as locating means for adjacent stator sections, as will also hereinafter appear. A pair of generally semi-circular recesses 24 and 25 are provided in the upper surface of the outer ring 15, and numbers or other suitable indicia may be provided therein for the individual switching stations to be hereafter described.

A contact member 26 of conductive material is embedded in the stator section 13, and includes a plurality of first portions 27 extending generally radially outwardly of the outer ring 15, and a plurality of second portions 28 extending generally radially inwardly of the outer ring 15. Contact portions 27 are adapted to be connected into an electric circuit, as is well known in the art. Contact member 26 includes a web 29 which is spaced outwardly of inner ring 16, and is embedded in spokes 17. The stator sections are initially formed by cutting the contact member 26 from a blank of conductive material, and molding the insulating stator material around the cut stator contact portions. Web 29 initially connects each of the contact member second portions 28, and it will be understood, of course, that the above described stator section 13 may be manufactured and stored until it is needed for assembly into a particular switch. At that time, the stator section 13 may be punched and trimmed to create one or more downwardly inclined long stator contact jaws 28a or one or more short stator contact jaws 28b. Contact jaws 28a and 28b form double wipe contact means, in combination with the rotor contact to be hereafter described. As can be best seen in FIGS. 2 and 3, during this punching and trimming operation, the downwardly inclined contact portions are severed from the web 29, so as to create independent stator contacts. The stator contact member 26 is formed from a suitable conductive material which has an inherent resilience so that the downwardly inclined contact portions are urged downwardly with a predetermined amount of force. As can be seen in FIG. 1, a plurality of additional binding posts 30 may be provided between the stator contact member first portions 27. The additional binding posts 30 are physically unconnected from the web 29, and are initially connected to the contact portions 27. During the trimming and punching operation, the binding posts 30 are severed from the contact member portions 27. It will be understood, of course, that some or all of the additional binding posts 30 may be omitted, if desired.

The lower stator section 14 includes an annular outer ring 35, an annular inner ring 36 concentric with outer ring 35, and a plurality of radial spokes 37 extending therebetween. As can be best seen in FIGS. 2 and 3, the inner and outer rings 35 and 36 are generally rectangular in cross section, and the lower surfaces thereof are generally coplanar. Outer ring 35 is somewhat thicker than inner ring 36, so that the upper surfaces thereof are disposed in spaced, generally parallel planes. The spokes 37 are substantially the same thickness as the inner rings 36, so that the respective upper and lower surfaces thereof are generally coplanar. An annular recess 38 is provided in the upper surface of the inner ring 36 to define an undercut shoulder 39. Recesses 18 and 38 cooperate to provide a rotor receiving chamber, and shoulders 19 and 39 confine the rotor 12 therein. Spokes 37 cooperate to define generally segmented openings that are generally the same as, and adapted to be positioned in vertical alignment with the openings 20 and 20a in upper stator section 13.

Diametrically opposed apertures 41 are provided in the outer ring 35, and are adapted to be aligned with the openings 21 in the upper stator section 13. A pair of arcuate locating surfaces 42 (FIG. 3) are provided in the upper surface of the outer ring 35, and are adapted to have the sides of projections 23 seated thereagainst to properly locate openings 21 with respect to openings 41. Generally cylindrical projections 43 are provided on the lower surface of the outer ring 35 around apertures 41, and serve as locating means for adjacent stator sections in the event that they are provided. A pair of generally semi-circular recesses 44 and 45 are provided in the lower surface of the outer ring 35, and numbers or other suitable indicia may be provided therein corresponding to the indicia in recesses 24 and 25.

Fastening means, in the form of a rivet 50 or the like, extend through openings 21 and 41 to secure switch sections 13 and 14 to one another. If additional switch sections are to be provided, the projections 43 on these sections are nested within recesses 22, and common fasteners are used to secure each of these sections to one another.

A contact member 46 is embedded in the stator section 14, and is identical to the contact member 26 of upper stator section 13 in all respects except that the second portions 48a and 48b of contact 46 extend upwardly rather than downwardly. The respective stator contact portions 28a and 48a, and 28b and 48b are resiliently urged toward one another after they have been punched from the contact blanks, so as to make effective contacting engagement with the contact portions of a rotor contact to be hereafter described.

The rotor 12 is formed from an annular ring 51 of suitable insulating material, and having a bore 52 of non-circular configuration (as a "Double-D") for reception of a correspondingly shaped driving shaft (not shown). Rotor 12 includes a rotor contact 53 formed of suitable conductive material, and contact 53 is initially defined by a web or blank of material which is molded integrally with the ring 51. The rotor may be stored in this form until it is desired to assemble a particular switch, at which time the appropriate rotor contacting portions are punched, or otherwise appropriately formed from the rotor contact blank. The rotor contact may include relatively short contacting portions, such as shown at 53a in FIG. 2 for engagement with the relatively long stator contacts 28a, and relatively long contacting portions; such as those shown at 53b for engagement with the relatively short stator contacts 28b.

From the foregoing it will be readily apparent that switch of the present invention embodies novel rotor and stator sections which can be economically manufactured and easily assembled. The rotor and stator sections can be stored until they are ready for use, at which time a wide variety of contact patterns can be established, by forming the contacting portions of the rotor and stator contacts to the desired configuration. Thus, it should be clear that each of the objects of the invention have been fully achieved.

I claim:

1. An electric switch comprising: a generally planar stator including first and second stator sections; each of said stator sections including an annular outer ring, an annular inner ring concentric with said outer ring and having a recess in one side thereof, and a plurality of generally radial spokes connecting said rings so as to define openings between adjacent spokes; a stator contact member embedded in each of said stator sections, each of said stator contact members having a plurality of first contact portions extending generally radially outwardly of their respective outer rings, and a plurality of resilient second contact portions radially aligned with said first contact portions and extending generally radially inwardly of said outer rings and being inclined with respect to the plane of said stator section; said second contact portions each being positioned in alignment with one of said openings; cooperating means on said stator sections for positioning the sections in opposition to one another and to locate their respective inner rings, outer rings, and spokes in alignment with one another whereby said inner ring recesses are spaced from one another and opposed stator contact second portions are inclined toward one another; and a rotor rotatably mounted between said inner ring recesses and having a rotor contact member embedded therein, said rotor contact member having at least one portion extending generally radially outwardly therefrom and adapted to move into and out of engagement with the opposed second stator contact portions upon rotation of said rotor relative to said stator.

2. An electric switch comprising: a stator including upper and lower stator sections secured to one another; each of said stator sections including an outer ring, an inner ring concentric with said outer ring, and a plurality of generally radial spokes connecting said rings so as to define openings between adjacent spokes; a recess in the lower surface of said upper stator section inner ring and in the upper surface of said lower stator section inner ring, said recesses cooperating to define a chamber adapted to receive a rotor therein; a stator contact member embedded in each of said stator sections, each of said stator contact members having a plurality of first contact portions extending generally radially outwardly of their respective outer rings, and a plurality of resilient second contact portions radially aligned with said first contact portion and extending generally radially inwardly of said outer rings, said second contact portions each being positioned in alignment with one of said openings, and the second contact portions on said upper stator section being inclined downwardly and the second contact portions on said lower stator section being inclined upwardly; and a rotor rotatably mounted in said chamber and having a rotor contact member embedded therein, said rotor contact member having at least one first portion extending generally radially outwardly therefrom and adapted to move into and out of engagement with the second stator contact portions upon rotation of said rotor relative to said stator.

3. A switch as defined in claim 2 in which said rotor contact is positioned generally centrally of said rotor.

4. A switch as defined in claim 2 in which said outer rings are thicker than said inner rings.

5. A switch as defined in claim 2 wherein said outer rings are thicker than said spokes.

6. A switch defined in claim 5 wherein said spokes are substantially the same thickness as said inner ring.

7. A switch as defined in claim 2 in which the upper surface of the upper stator section inner ring is generally coplanar with the upper surface of the upper stator section outer ring, and wherein the lower surface of the lower stator section inner ring is generally coplanar with the lower surface of the lower stator section outer ring.

8. A switch as defined in claim 7 in which the lower surface of the upper stator section inner ring is spaced above the lower surface of the upper stator section outer ring, and wherein the upper surface of the lower stator section inner ring is spaced below the upper surface of the lower stator section outer ring.

9. A switch as defined in claim 8 in which the upper and lower surfaces on the spokes are generally coplanar with the upper and lower surfaces respectively on the respective switch sections.

10. A switch as defined in claim 2 in which one of said stator sections is provided with a recess having a locating surface, and wherein the other of said stator sections includes a projection fitting within said recess and having a locating surface shaped complementarily with the first mentioned locating surface.

11. A switch as defined in claim 2 in which said rotor contact member has at least one second portion extending generally radially outwardly therefrom a distance greater than said rotor contact member first portion, and wherein at least one of said stator contact member second portions extends radially inwardly of its stator section outer ring a distance less than the other stator contact second portions in position for engagement with said rotor contact member second portion upon rotation of said rotor relative to said stator.

12. A switch as defined in claim 2 wherein said stator contact members include additional contact portions extending generally radially outwardly from said outer rings between said stator contact member first portions.

13. A stator section for use in an electric switch comprising: an annular inner ring having top and bottom surfaces, an annular recess in said bottom surface around the inner diameter of said annular ring; an annular outer ring concentric with said inner ring and having top and bottom surfaces, said outer ring being thicker than said inner ring and having top and bottom surfaces generally coplanar with the respective top and bottom surfaces of said inner ring; and a stator contact member embedded in said stator section, said contact member having a plurality of first portions extending generally radially outwardly of said outer ring and a plurality of second portions each integral with one of said first portions and extending generally radially inwardly of said outer ring, said contact member second portions each being aligned with one of said openings, said contact member including an annular web portion embedded in said spokes and spaced outwardly of said inner ring, said web portion initially connecting each of said contact member second portions and being severed from certain of said contact member second portions to render said certain contact member second portions independent of the other contact member second portions.

14. A stator section as defined in claim 13 wherein said certain contact member second portions are inclined downwardly.

15. A stator section as defined in claim 13 wherein a pair of spaced apertures are provided in said outer ring, each of said apertures being radially aligned with one of said spokes.

16. A stator section as defined in claim 13 in which said apertures are diametrically opposed; and wherein an annular recess is provided in the top surface of said outer ring around each aperture, and a generally cylindrical projection is provided on the bottom surface of said outer ring surrounding said aperture.

17. A stator section for use in an electric switch comprising: an annular inner ring having top and bottom surfaces, an annular recess in said top surface around the inner diameter of said annular ring; an annular outer ring concentric with said inner ring and having top and bottom surfaces, said outer ring being thicker than said inner ring and having its bottom surface generally coplanar with the bottom surface of said inner ring; a plurality of radial spokes connecting said inner and outer rings so as to define openings between adjacent spokes, said spokes being of substantially the same thickness as said inner ring and having top and bottom surfaces generally coplanar with the respective top and bottom surfaces of said inner ring; and a stator contact member embedded in said stator section, said contact member having a plurality of first portions extending generally radially outwardly of said outer ring and a plurality of second portions each integral with one of said first portions and extending generally radially inwardly of said outer ring, said contact member second portions each being aligned with one of said openings, said contact member including an annular web portion embedded in said spokes and spaced outwardly of said inner ring, said web portion initially connecting each of said contact member second portions and being severed from certain of said contact member second portions to render said certain contact member second portions independent of the other contact member second portions.

18. A stator section as defined in claim 17 wherein said certain contact member second portions are inclined upwardly.

19. A stator section as defined in claim 17 wherein a pair of spaced apertures are provided in said outer ring, each of said apertures being radially aligned with one of said spokes.

20. A stator section as defined in claim 19 in which said apertures are diametrically opposed; and wherein a recess is provided in the top surface of said outer ring around each aperture, and a generally cylindrical projection is provided on the bottom surface of said outer ring surrounding said aperture.

References Cited by the Applicant

UNITED STATES PATENTS

| | | |
|---|---|---|
| 2,447,718 | 8/1948 | Simpson. |
| 2,988,606 | 6/1961 | Allison. |
| 3,144,711 | 8/1964 | Stevens. |

ROBERT S. MACON, *Acting Primary Examiner.*

J. R. SCOTT, *Assistant Examiner.*